(12) United States Patent
Bennett et al.

(10) Patent No.: US 10,457,163 B2
(45) Date of Patent: Oct. 29, 2019

(54) OCCUPANT DETECTION AND CLASSIFICATION SYSTEM

(71) Applicant: TK Holdings Inc., Auburn Hills, MI (US)

(72) Inventors: Jeffrey S. Bennett, Brownstown, MI (US); Joseph A. Schultz, Clarkston, MI (US); Daniel A. Dalimonte, Commerce Township, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 578 days.

(21) Appl. No.: 15/215,136

(22) Filed: Jul. 20, 2016

(65) Prior Publication Data
US 2018/0022231 A1 Jan. 25, 2018

(51) Int. Cl.
*G01R 27/26* (2006.01)
*B60N 2/00* (2006.01)
*G01V 3/08* (2006.01)

(52) U.S. Cl.
CPC ............... *B60N 2/002* (2013.01); *G01V 3/08* (2013.01)

(58) Field of Classification Search
CPC .................................. B60N 2/002; G01V 3/08
USPC ......................................................... 324/686
See application file for complete search history.

(56) References Cited

U.S. PATENT DOCUMENTS

| | | | |
|---|---|---|---|
| 6,329,914 B1* | 12/2001 | Shieh | G08B 13/26 180/271 |
| 6,348,862 B1 | 2/2002 | McDonnell et al. | |
| 6,502,048 B1* | 12/2002 | Lichtinger | G01G 19/4142 177/25.11 |
| 7,363,184 B2 | 4/2008 | Hibner et al. | |
| 7,464,960 B2 | 12/2008 | Winkler et al. | |
| 7,676,339 B2 | 3/2010 | Fleet | |
| 7,684,913 B2 | 3/2010 | Hibner et al. | |
| 2004/0215381 A1 | 10/2004 | Jitsui et al. | |
| 2007/0192007 A1* | 8/2007 | Stanley | B60N 2/5685 701/45 |
| 2007/0194900 A1 | 8/2007 | Hawkins et al. | |
| 2011/0115500 A1* | 5/2011 | Stanley | B60N 2/002 324/661 |

(Continued)

OTHER PUBLICATIONS

International Search Report and Written Opinion dated Sep. 28, 2017 issued in PCT/US2017/042792.

*Primary Examiner* — Melissa J Koval
*Assistant Examiner* — Courtney G McDonnough
(74) *Attorney, Agent, or Firm* — Gordon Rees Scully Mansukhani, LLP

(57) ABSTRACT

A system for detecting an occupant in a vehicle seat that includes a sensing electrode located in a seat bottom of a vehicle seat. The system also includes a shield electrode located in the vehicle seat below the sensing electrode. A sensing circuit is operatively coupled to the sensing electrode and the shield electrode. A controller is operatively coupled to the sensing circuit, wherein the controller operates to configure the sensing circuit to apply current to the shield and sensing electrodes. The controller is configured to detect the presence of an object in the seat by comparing a measure of the quadrature component of the sensing current to a threshold wherein the measure is adjusted by an offset value that varies based on a value of a non-volatile counter.

20 Claims, 6 Drawing Sheets

(56) References Cited

U.S. PATENT DOCUMENTS

2011/0163765 A1* 7/2011 Gray ................. B60N 2/002
  324/665
2013/0207676 A1 8/2013 Virnich et al.

* cited by examiner

OCCUPANT DETECTION AND CLASSIFICATION SYSTEM

BACKGROUND

The present disclosure relates generally to the field of capacitive sensing systems and sensing methods. More specifically, the disclosure relates to capacitive sensing systems and sensing methods for a vehicle seat.

There is a need for a system and method for accurate differentiation of an occupant from an object placed on a seat in an occupant classification system.

BRIEF DESCRIPTION OF THE DRAWINGS

These and other features, aspects, and advantages of the present invention will become apparent from the following description and the accompanying exemplary embodiments shown in the drawings, which are briefly described below.

DETAILED DESCRIPTION

Figure 1:
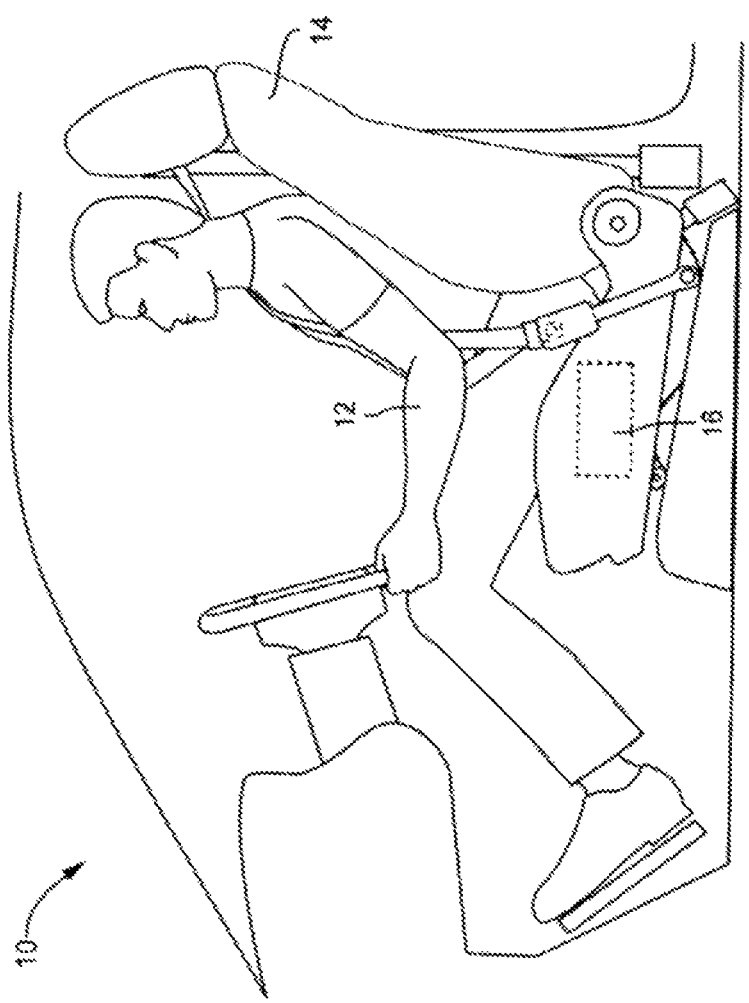
FIG. 1 is a schematic diagram of a vehicle seat, according to an exemplary embodiment.

The figures illustrate the exemplary embodiments in detail. However, it should be understood that the application is not limited to the details or methodology set forth in the description or illustrated in the figures. It should also be understood that the terminology is for the purpose of description only and should not be regarded as limiting.

A capacitive or electric field type sensor for use in an occupant classification system or occupant sensing system (for example, a system to detect occupancy of a vehicle seat) may be implemented in many ways. For example, according to one embodiment, an AC current may be provided to a sensing electrode located in a vehicle seat. The current or change in the current to the sensor may be measured and used as an indicator of the impedance from the sensing electrode to ground. In certain vehicle seat configurations, a seat heater may be provided. According to one embodiment of a occupant sensing system, an electrode may function as both a capacitive sensing electrode and a seat heater.

In an occupant classification system, the occupant is classified using information from sensors that sense characteristics about the object located on a vehicle seat. Some systems sense the total weight on the seat. When a capacitive sensor is used to classify the occupant, the environment above the seat cover is sensed using various techniques to identify the dielectric and conductive properties of the occupant. A conductive sensing element is placed in the seat and, according to one embodiment, the impedance from the electrode to ground may be used as an indicator of the occupant situation above the seat cover.

The occupant detection and classification system is configured so that the environment below the seating surface does not influence the classification of the occupant. When a seat heater is provided, typically a resistive heater is employed. A resistive heater is essentially a grounded wire or conductor located in the vehicle seat. The sensing electrode for an occupant classification and detection system may be placed above the seat heater. If the orientation between the sensing electrode and the heater changes, the offset capacitance will change and the change may result in a negative impact on the ability of the system to accurately classify the occupant. For example, the detection system may be configured to include an offset for the measurement of an empty seat condition. If the empty seat offset of the measurement drifts significantly (e.g., due to a change in orientation of the electrode and heater), the system may not accurately classify the occupant.

According to various exemplary embodiments, a sensing system for automotive occupant classification may use various conductors in the seat as sensing electrodes. For example, the sensing system may include a "sensor" conductor or assembly located above a "shield" conductor. The shield conductor is configured to reduce sensitivity of the sensing system to or interference from objects below the shield (e.g., seat pan, seat heater, etc.). Due to the provision of a shield electrode, the occupant sensing system may be maintained in the same sensing configuration for sensing objects above the seat while the shield prevents the system from sensing of objects below the sensing electrode. A capacitive sensing occupant classification system may use the measurements obtained from a sensing electrode to classify the occupant of a vehicle seat, and to determine whether to remind the occupant to buckle their seat belt.

According to other exemplary embodiments, a sensing system may use multiple electrodes on opposite sides of a thick piece of foam. Measurements may be made while the electrodes are in various configurations. According to still other exemplary embodiments, a sensing system may combine or integrate weight sensing concepts with capacitive sensing concepts into a single system. The integrated system may use weight/pressure information along with capacitive information to identify the occupant situation and produce a preferred classification.

According to various exemplary embodiments, a sensing system may use electronic methods for making capacitive measurements (e.g., using high frequency current measurements or other methods). The sensor assembly materials may include any type of conductive material for the electrodes (e.g., copper, conductive inks, conductive fabrics, etc.) and any compressible material for the spacer between the sensor and the shield (e.g., non-woven felts, woven materials, foams, materials used to allow air flow for forced air climate control seats, or any other material that will significantly compress at pressures under 1 psi).

Referring generally to the figures, an occupant classification system is described that uses a sensor (e.g., a capacitive vehicle sensor) to detect seat occupancy and to detect a weight on the seat. The occupant classification system may generally include a sensor and a shield. For occupant sensing, the sensor may be oriented above the shield to reduce the influence objects located under the shield (e.g., a seat heater) have on sensor measurements. The classification system may include a weight or force sensing capability. When sensing the weight, the sensor and shield may switch orientations (e.g., via electronic switching) with the sensor oriented below the shield to reduce the influence objects placed on top of the seat (e.g., electronic devices) have on sensor measurements. The occupant sensing and weight or force sensing measurements may be used together to determine whether an object on the seat is a person and may reduce the false detection of objects as people.

Referring to FIG. 1, a vehicle 10 is shown with an occupant 12 in a seat 14 of the vehicle 10, according to an exemplary embodiment. The seat 14 may include an occupant classification and detection system 16. As shown in FIG. 1, the occupant classification system 16 may generally be located in the seat 14 below the area in which an occupant 12 of the vehicle 10 sits, or may be located in other areas of the seat 14 or vehicle 10.

The occupant classification system 16 may generally include a sensor, a shield, and electronics for sensing and classifying the occupancy of the seat 14. For example, the sensor may be used to provide measurements that correspond to the effect of an object on the sensor due to both the conductivity and weight of the object. Measurements from the sensor may be evaluated to determine the existence of an object or occupant in the seat 14. The occupant classification system 16 may include or be configured to operate in conjunction with a seat heating system and/or other systems for the seat 14 of the vehicle 10.

The occupant classification system 16 includes a capacitive or electric field sensor that includes a sensing electrode. The capacitive sensor may generally be capable of sensing properties such as a proximity, position, or weight of an object, or the like. Various measurements from the sensing electrode may be used to detect the presence of an object in the seat. For example, the system may measure the change in capacitance (e.g., changes in an electrical property between two conductive objects). As an occupant 12 sits on seat 14, the system may detect a capacitance change to determine the presence of the occupant 12 by the occupant classification system 16.

Figure 2A:
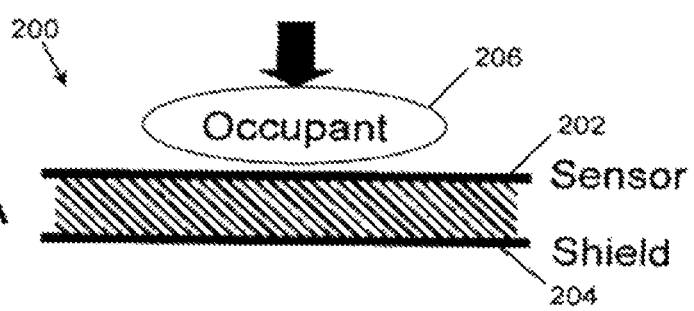
FIGS. 2A-2C are schematic diagrams of a capacitive sensing system, according to an exemplary embodiment.

According to one embodiment, as shown in FIG. 2A, a capacitive based occupant classification system 200 includes an upper electrode 202 and a lower planar electrode 204. In the embodiment of FIG. 2A, the upper planar electrode 202 is a sensing electrode 202 and the lower planar electrode 204 is a shield electrode. During a typical or normal measurement mode or configuration, the system 200 detects changes in the signal from the sensing electrode—the upper electrode 202 closest to an occupant 206—to determine whether an occupant is present. The shield electrode (the lower electrode 204) is located below the sensing electrode in a vehicle seat. The sensing electrode and the shield electrode may be changed to different configurations to measure the force on the surface of the seat.

During the normal measurement mentioned above, the system may employ a sensing, detection and classification system such as described in U.S. Pat. No. 8,818,637, which is incorporated by reference herein. Preferably, the capacitive sensing system sends a time varying voltage out to the sensing electrode and measures the loading current to ground from the sensing element. The time varying voltage could take many shapes, although a preferred shape is a sinusoidal signal at frequencies between about 50 kHz and about 150 kHz. This loading current increases significantly when an adult occupant is on the seat and only slightly when there is a child seat on the vehicle seat.

Embodiments utilize a measurement system that measures the in-phase (I) and quadrature (Q) components of the current supplied to the sensing electrode. With such a measurement system, separation remains between the adult and the RFIS/wet situation. Thus, the sensor system can distinguish between an adult and an RFIS on the seat in normal and wet seat situations. Preferably, the system and methods disclosed herein use the I and Q measurements, seal the sensing electrodes from direct contact with the wet seat foam of the vehicle seat, and ensure that the seat structure is grounded to allow separation between the RFIS/wet and normally seated adult cases.

Figure 6:
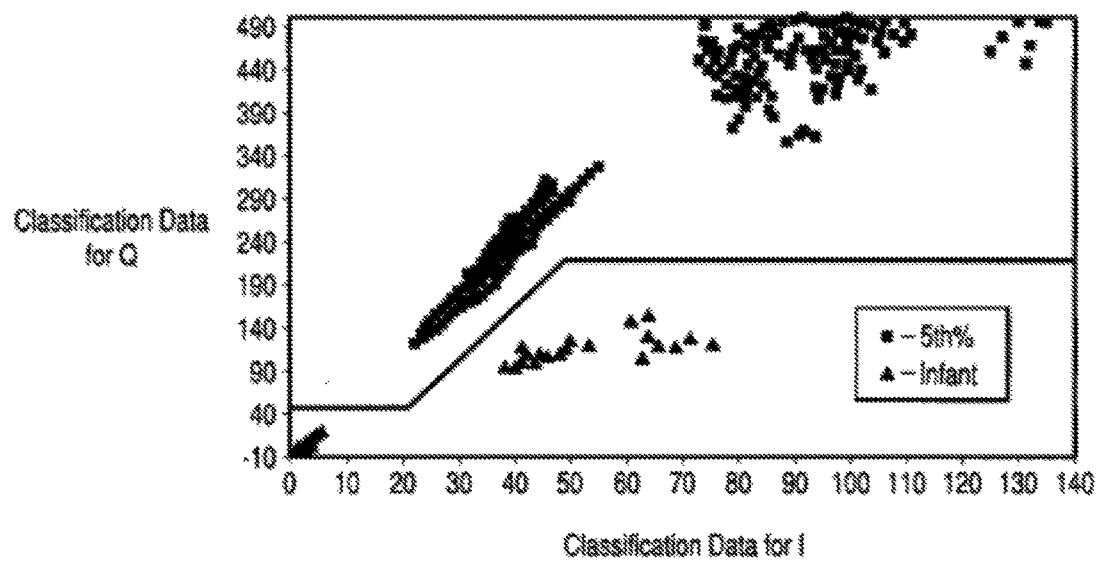
FIG. 6 is a graph showing separation between fifth percent adults and infants during many conditions, including wet seat conditions; the X-axis shows the quadrature component and the Y-axis shows the in-phase component of the measurement.

Embodiments of the system can use both the I and Q measurements measured by a current measurement circuit, which sends the I and Q measurements to a microprocessor, to make a classification of the occupant during wet seat situations because the nature of the impedance to ground changes when the seat is wet. FIG. 6 shows measurement results of a system when the set cover and seat foam of the vehicle seat are wet. Without both I and Q, there would be overlap between the RFIS (infant cases) and small adults (the "standard small adult" are referred to as "5th %" cases, which are occupants approximately 108 lbs.). With I and Q measurements, there is a recognized separation between the RFIS cases and the small adult cases.

In FIG. 1, the measurement results illustrate the I and Q measurements taken over a sample that includes two seat designs in which three cloth seats and two leather seats were utilized. The measurements were taken both during wet seat situations and dry (normal) situations in which the occupants were seated in a normal seating position on the seat (i.e., the occupant is not in an out-of-position situation). The occupants include small adults and RFIS with infants.

In an embodiment, it is not critical that I and Q measurements are made for the system to work. For example, the phase and amplitude of the current sent to the sensing electrode could be measured to gain equivalent information. According to an embodiment, the impedance from the sensing electrode to ground should be characterized such that capacitive components of the impedance affect the measurement differently than the resistive components of the impedance.

According to an embodiment, time varying shapes may be used that are not sinusoidal signals for the sensing. If this is the case, alternative methods of identifying the characteristics of the impedance could be used. For example, square pulses could be sent out to the sensing electrode. The current sent out to the sensing electrode could be measured and characteristics such as the peak and rise time of the current pulse could be used to characterize the sensing electrode's impedance to ground. Alternatively, several pulses of different length could be sent out to the sensing electrode. Characteristics of the impedance could be derived by analyzing the relationship between the peak currents and the variation of the current with pulse length.

Figure 2B:
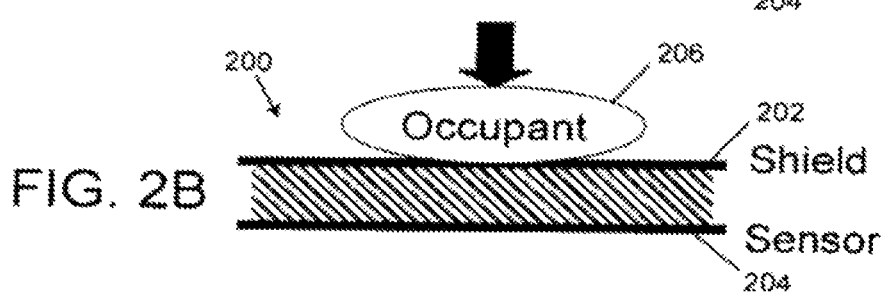

Referring to FIG. 2B, in one exemplary embodiment, the role or function of the sensing electrode and the shield electrode may be switched when the occupant classification and detection system is operated in a force or weight measurement mode. In the weight measurement mode, the system 200 may be configured to be less sensitive to the presence of the occupant and may be used to determine the weight of the occupant 206. During the weight measurement mode, capacitive or electric field sensing is performed using the measurements obtained from the lower electrode 204 furthest from the occupant (the shield electrode in the occupant sensing measurement) and the upper electrode 202 closest to the occupant 206 is switched to become the shield electrode. The electrodes 202, 204 may be switched using electronic or mechanical switches configured to modify the current flow through the electrodes. Instead of using the lower sensing electrode to measure the presence of the occupant, in the force or weight measurement mode, the system's electronics and/or software may be configured to measure the capacitance (or current or impedance) between the sensor and the shield (the electrodes 202, 204). The measured capacitance (or a measure representative or related to the capacitance or current or impedance) may be compared to a threshold value. A difference between the measured value and the threshold value can be attributed to a change in relative location of the sensors due to a force on the seat. The measurement may be made without being significantly influenced by the conductive or dielectric characteristics of the occupant 206 because the occupant 206 is shielded from the measurement by the upper electrode 202.

Figure 2C:
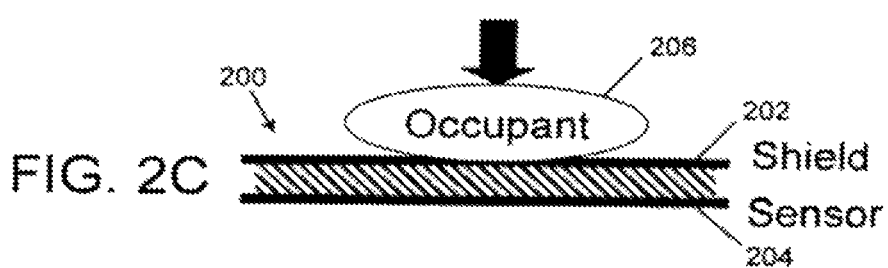

Referring to FIG. 2C, as the force on the seat bottom is increased, material 208 between the sensor (electrode 204) and the shield (electrode 202) is compressed. This compression causes the electrodes 202, 204 to move closer together causing a corresponding increase in the capacitance between the two electrodes 202, 204. The capacitance between the electrodes 202, 204 (or any other measure that is an indication of the change in relative position between the electrodes 202, 204) may be used to estimate the force on the seat applied by the occupant 206. The force on the seat may be used to differentiate between an occupant (i.e., person) and an inanimate object (e.g., computer).

Figure 3A:
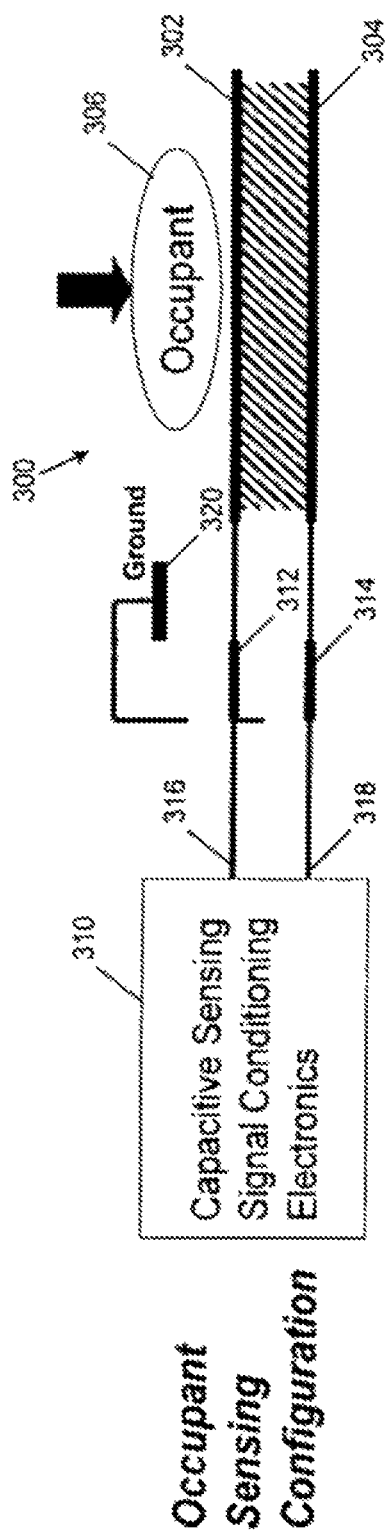
FIGS. 3A and 3B are schematic diagrams of a capacitive sensing system, according to another exemplary embodiment.
Figure 3B:
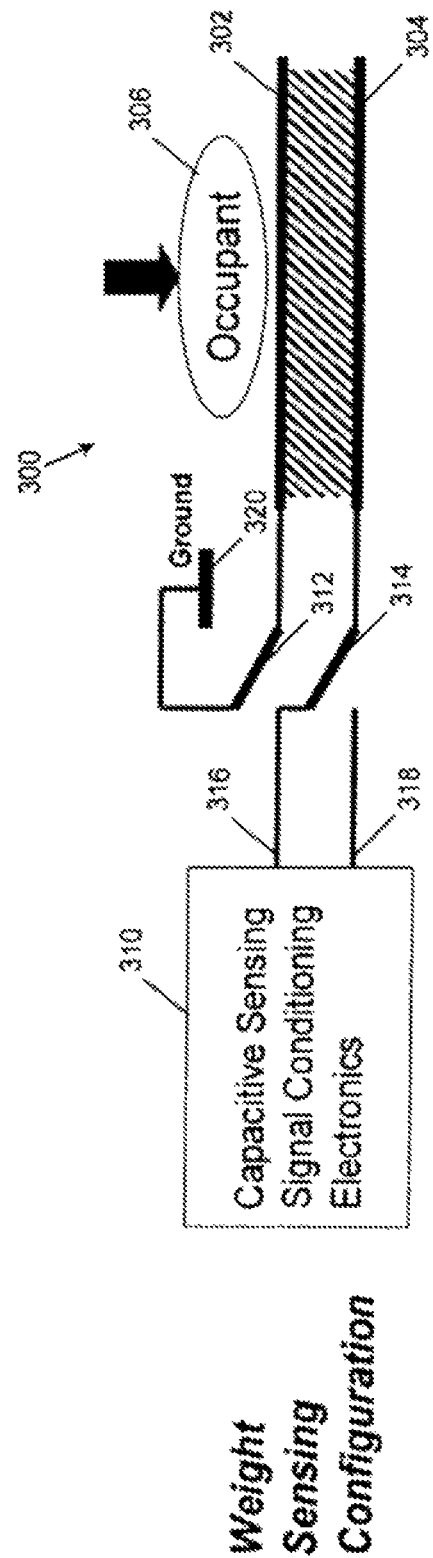

FIGS. 3A and 3B disclose another exemplary embodiment of a capacitive or electric field type occupant classification and detection system. The system 300 shown in FIGS. 3A and 3B is similar to the system 200 of FIGS. 2A-2C and includes an upper electrode 302 and a lower electrode 304 for sensing an occupant 306. The system 300 further includes electronics 310 (e.g., sensing and signal conditioning electronics) configured to provide current or signals to drive the electrodes 302, 304 and to provide measurements on the electrodes 302, 304.

The occupant classification and detection systems disclosed herein may include a controller, processor or electronic control unit (ECU) that controls the system and receives various measurements from the system components (e.g., the sensing electrodes). The controller is configured to interact with other vehicle systems such as, for example, vehicle safety systems (e.g., airbag and seat belt systems). The controller may provide a signal to a vehicle safety system that indicates whether an adult person is located in the vehicle seat so that safety devices may be activated if appropriate. The controller for the occupant classification system may be integrated with a controller for another vehicle system such as, for example, the controller used for a vehicle safety system.

Referring specifically to FIG. 3A, the system 300 includes an occupant sensing mode or configuration for detecting the occupant 306 while shielding interference from below the system 300, according to one exemplary embodiment. System 300 includes a switch 312 that electrically couples the upper electrode 302 to a sensing port 316 of the electronics 310 and includes a switch 314 that electrically couples the lower electrode 304 to a shield port 318 of the electronics 310. In the configuration of FIG. 3A, the upper electrode 302 is the sensing electrode and the lower electrode 304 is the shield electrode.

Referring now to FIG. 3B, the system 300 also includes a weight or force sensing mode or configuration that reduces sensitivity to electrical properties of the occupant 306 and may be used for determining the weight of the occupant 306, according to one exemplary embodiment. In the embodiment of FIG. 3B, the conductor or upper electrode 302 near the occupant 306 is switched to ground 320 and the conductor or lower electrode 308 away from the occupant 306 is switched to the sensing port 316 of the electronics 310. In the configuration of FIG. 3B, the upper electrode 302 is the shield electrode and the lower electrode 304 is the sensing electrode.

The electronics 310 employed by the system may be software and any analog or digital circuitry capable of controlling the occupant classification system 300. Also, according to various exemplary embodiments, the switches 312, 314 may be any electronic or mechanically actuated switches capable of modifying a flow of electrical current. The electronics 310 may be configured to control the switching of the switches 312, 314. For example, the system 300 may generally be in an occupant sensing configuration and only switch to a weight sensing configuration for verification if the sensing configuration determined the occupant to be of adult size. Alternatively, the switching may occur periodically at a time interval.

The addition of a weight or force measurement to the electric field or capacitive measurement allows the system to separate or discriminate between cases where an object may look large (e.g. appear like an adult) to the capacitive sensing system 200, 300, but is physically small. For example, capacitive loading or electrical interference generated by electronic devices on the seat, especially when those devices are plugged into the 12 volt accessory plug in the vehicle, may cause an increase in measured capacitance when the sensing node is positioned above the shield node. Such electronic devices may include cellular phones, smart phones, personal digital assistants (PDAs), global positioning systems (GPS), optical disc (e.g., DVD, Blu-Ray, etc.) players, laptop computers, or any other electronic device. Electronic devices may appear large to the capacitive sensor because they are conductors and are well coupled to ground. Recognizing electronic devices or other objects on the seat incorrectly as adults may cause an annoyance when the vehicle seat belt reminder turns on. The exemplary embodiments described above solve the annoyance issue by integrating a low cost force measurement into a capacitive sensing system. The weight sensing configuration may also be used to identify the empty seat and diagnose problems with the capacitive sensing system and the same measurement electronics and connections out to the sensor may be used for the weight measurement and the capacitive measurement, resulting in a low cost solution.

The exemplary embodiments of FIGS. 2 and 3 may use any configuration of electrodes where the change in relative physical location of the sensor to shield is measured electronically and is not influenced significantly by the conductive or dielectric characteristics of the occupant. According to alternative exemplary embodiments, instead of detecting the capacitance between the sensor and shield electrodes, the system may use multiple measurements in multiple configurations to calculate a high frequency (e.g., about 100 kHz, greater than 100 kHz, etc.) AC current flowing only between the sensor and shield. A significant increase in that measured current indicates an increase in the sensor to shield capacitance, which indicates a change in relative position of the sensor and shield due to an increased force from the occupant. According to other examples, the capacitance between the sensor and shield electrodes may be measured by analyzing a change in an RC time constant, a change in a response of the system to a step voltage to the electrodes, a change in charge sharing between the electrodes, or any other method of measuring capacitance.

Figure 4:
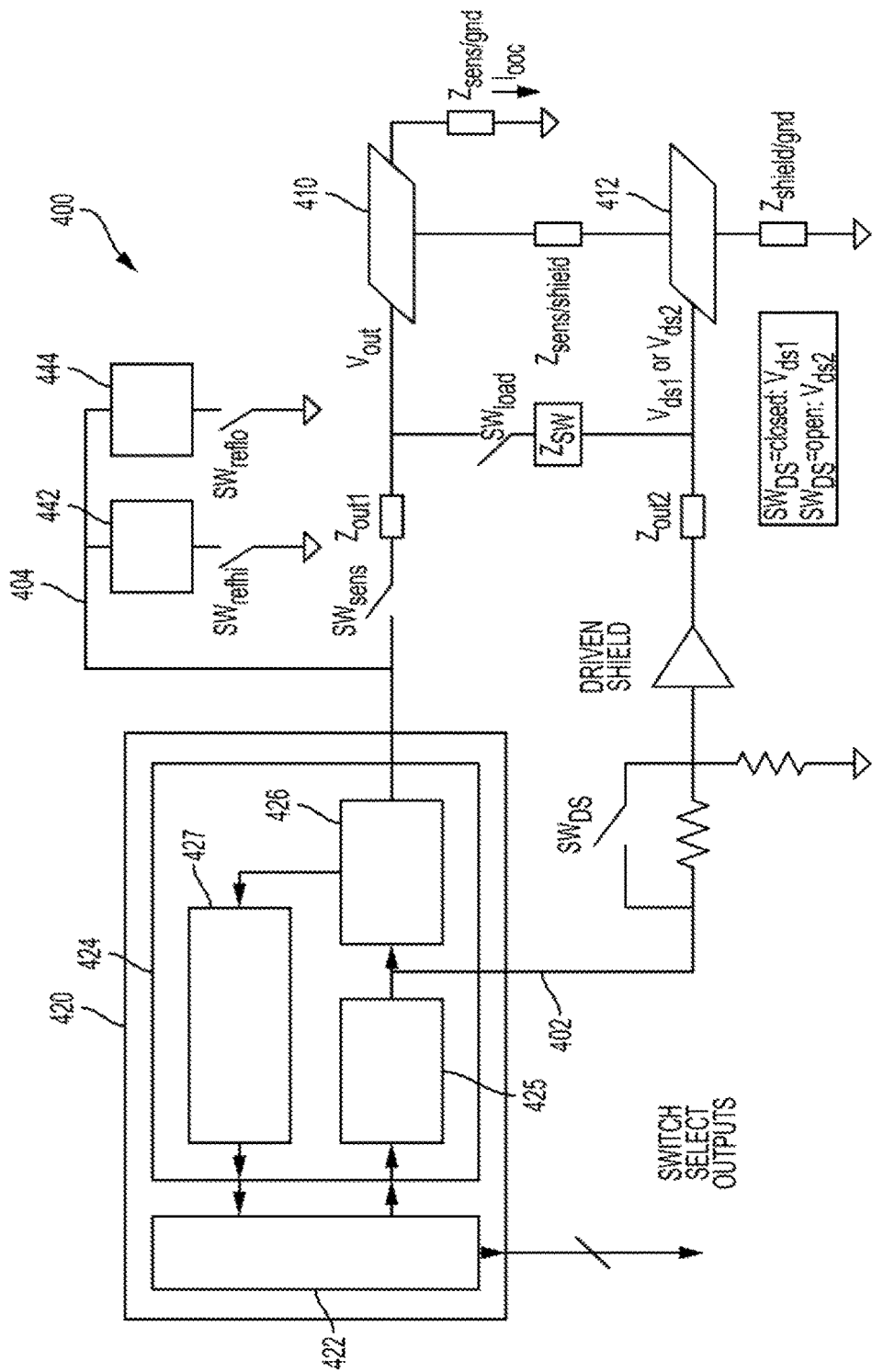
FIG. 4 is a circuit diagram of the occupant detection system according to one exemplary embodiment.

FIG. 4 depicts a representative or exemplary circuit diagram of an occupant detection system 400 according to one exemplary embodiment. The occupant detection system 400 includes a sensing circuit 402 electrically connecting the sensing electrode 410, the shield electrode 412, switches $SW_{DS}$ and $SW_{load}$, and electronics 420. The sensing circuit 402 may also include a signal producing device 406, such as an amplifier or transistor, disposed between electronics 420 and the shield electrode 412. The sensing electrode 410 may also include a conductor, sensing node, or other device, such as an inductor, disposed outside the electronics 420. The shield electrode 412 may also include a conductor or other device, such as a shield node, disposed between the shield electrode 412 and signal producing device 406. While the sensing circuit 402 is shown outside the electronics 420, the electronics 420 may include components of the sensing circuit 402, such as switches, amplifiers, or other devices. For example, the electronics 420 and components of the sensing circuit 402 may be integral, disposed in a common housing, or on a common circuit board, while the sensing and shield electrodes 410, 412 are external to the housing and electrically coupled to the electronics 420. Those skilled in the art, however, will recognize that other configurations are possible according to other embodiments.

The electronics 420 generally include a controller 422 and a signal conditioning device 424. The signal conditioning device 424 generally includes a sine wave output device 425, a current sense circuitry 426, and a demodulation and filtering device 427. The signal conditioning device 424 produces an output signal, measures current, and produces an input signal corresponding to the measured current.

The controller 422 may be a microprocessor or electronic control unit (ECU) and controls the occupant detection system 400. The controller 422 determines when the signal conditioning device 424 produces an output signal, opens and closes the switches $SW_{DS}$ and $SW_{load}$, and interprets the input signal received from signal conditioning device As described further below, the system 400 may be operated to obtain certain measurements that may be used to obtain a representative indication of the force on the vehicle seat, such as when the occupant's weight forces the sensing electrode 410 toward the shield electrode 412. The electronics 420 are used to calculate the impedance between the sensing electrode 410 and shield electrode 412, which can be used to classify the occupant. The electronics 420 may also be used to calculate the impedance between the sensing electrode 410 and ground, which can be used to detect an occupant. The electronics 420 may also be used to calculate the impedances between the sensing electrode 410 and both the shield electrode 412 and ground to both detect and classify an occupant.

The controller 422 may be a microprocessor or electronic control unit (ECU) and controls the occupant detection system 400. The controller 422 determines when the signal conditioning device 424 produces an output signal, opens and closes the switches $SW_{DS}$ and $SW_{load}$, and interprets the input signal received from signal conditioning device 424.

By opening and closing the switches $SW_{DS}$ and $SW_{load}$, the sensing circuit 402 of the occupant detection system 400 may be placed in four different configurations (i.e., switches $SW_{DS}$ and $SW_{load}$, respectively, are closed/open, closed/closed, open/open, and open/closed). Closing $SW_{DS}$ changes the amplitude of the output signal on the shield electrode 412, and closing $SW_{load}$ introduces an impedance $Z_{SW}$ between the sensor and shield electrodes 410, 412.

In each of the four circuit configurations, current is measured by the signal conditioning device 424, thus providing four current measurements $M_1$, $M_2$, $M_3$, and $M_4$. $M_1$ is measured when $SW_{DS}$ is closed and $SW_{load}$ is open, $M_2$ is measured when $SW_{DS}$ is closed and $SW_{load}$ is closed, $M_3$ is measured when $SW_{DS}$ is open and $SW_{load}$ is open, and $M_4$ is measured when $SW_{DS}$ is open and $SW_{load}$ is closed.

From these four current measurements, a number proportional to the impedance between the sensing electrode 410 and shield electrode 412 (i.e., a force value) is calculated by the controller 422 as follows:

$$\frac{-Z_{sensor/shield}}{Z_{SW}} = \left(\frac{M_4 - M_2 - M_3 + M_1}{M_1 - M_3}\right)$$

This equation is derived from the following equations:

$$M_1 = \left(\frac{V_{out} - V_{ds1}}{Z_{sensor/shield}} + \frac{V_{out}}{Z_{sensor/ground}}\right)$$

$$M_2 = \left(\frac{V_{out} - V_{ds1}}{Z_{sensor/shield}} + \frac{V_{out}}{Z_{sensor/ground}} + \frac{V_{out} - V_{ds1}}{Z_{SW}}\right)$$

$$M_3 = \left(\frac{V_{out} - V_{ds2}}{Z_{sensor/shield}} + \frac{V_{out}}{Z_{sensor/ground}}\right)$$

$$M_4 = \left(\frac{V_{out} - V_{ds2}}{Z_{sensor/shield}} + \frac{V_{out}}{Z_{sensor/ground}} + \frac{V_{out} - V_{ds2}}{Z_{SW}}\right)$$

The number $$\frac{-Z_{sensor/shield}}{Z_{SW}},$$

thus, is proportional to the impedance between the sensing electrode 410 and the shield electrode 412 and may be used to determine the relative force on the vehicle seat in order to classify the occupant. The resulting occupant classification may be used, for example, to determine whether the seatbelt reminder should be turned on or whether an airbag should deploy.

From current measurements $M_1$, $M_2$, $M_3$, and $M_4$, a number corresponding to the impedance between the sensing electrode 410 and ground (i.e., a detection value) may also be calculated as follows:

$$i_{arc} = \frac{(M_1 \times M_4) - (M_2 \times M_3)}{M_1 + M_4 - M_2 - M_3}$$

This equation is derived from the following equations:

$$M_1 = i_{arc} + \left(\frac{1 - V_{ds1}}{Z_{sensor/shield}}\right)$$

$$M_2 = i_{arc} + \left(\frac{1 - V_{ds1}}{Z_{sensor/shield}}\right) + \left(\frac{1 - V_{ds1}}{Z_{SW}}\right)$$

$$M_3 = i_{arc} + \left(\frac{1 - V_{ds2}}{Z_{sensor/shield}}\right)$$

$$M_4 = i_{arc} + \left(\frac{1 - V_{ds2}}{Z_{sensor/shield}}\right) + \left(\frac{1 - V_{ds2}}{Z_{SW}}\right)$$

where $Z_{SW}$ is cancelled out and need not be known, but should be large enough to meaningfully change the calculations, and $Z_{sensor/shield}$ is derived from the equation for $$\frac{-Z_{sensor/shield}}{Z_{SW}}$$

above. The value for $i_{occ}$ corresponds to (i.e., is inversely proportional to) the impedance between the sensing electrode 410 and ground and may be used to determine the presence of the occupant or an object (i.e., detect an occupant).

According to one exemplary embodiment, the occupant detection system may also include a normalization circuit 404. The normalization circuit 404 enables the electronics 420 to adjust for measurement variations due changes in gain, offset shift and phase shift in the sensing circuit 402.

The normalization circuit 404 includes a high reference impedance device 442 and a low reference impedance device 444, each having a different, known impedance. Corresponding switches $SW_{refhi}$ and $SW_{reflo}$ selectively connect the high and low reference impedance devices 442, 444, respectively, to ground. The signal conditioning device 424 produces a 100 kHz, as an example, AC current at constant voltage and measures reference currents $M_{refhi}$ and $M_{reflo}$. Reference current $M_{refhi}$ is measured when $SW_{refhi}$ is closed and $SW_{reflo}$ is open, and reference current $M_{reflo}$ is measured when $SW_{refhi}$ is open and $SW_{reflo}$ is closed.

The sensing circuit 402 is provided with a switch $SW_{sens}$ to isolate the sensing circuit 402 and normalization circuit 404. When current measurements $M_1$, $M_2$, $M_3$, and $M_4$ are taken, $SW_{sens}$ is closed. When reference currents $M_{refhi}$ and $M_{reflo}$ are taken, $SW_{sens}$ is open, thus isolating the normalization circuit 404 from the sensing circuit 402.

By measuring reference currents $M_{refhi}$ and $M_{reflo}$ with respect to impedance devices 442, 444 of known impedance and isolating the normalization circuit 404 from the sensing circuit 402, the microprocessor 422 may calculate system impedance independent of the sensing circuit 402. In this manner, the microprocessor 422 may account for changes in gain, offset shift and phase shift in the sensing circuit 402 more accurately detect and classify the occupant.

According to various exemplary embodiments, the shield may be driven with any potential or signal that is compatible with the measurement concepts and the associated electronics hardware. For example, the shield may be driven with a signal that is similar to or the same as the sensor signal, may be connected to a fixed DC level, or may be driven with various signals to enable the multiple measurement concept mentioned above.

Although the occupant classification system 200, 300 is illustrated as including multiple features utilized in conjunction with one another, the system 200, 300 may alternatively utilize more or less than all of the noted mechanisms or features. For example, in other exemplary embodiments, the more electrodes may be used in the system 200, 300.

Figure 5:
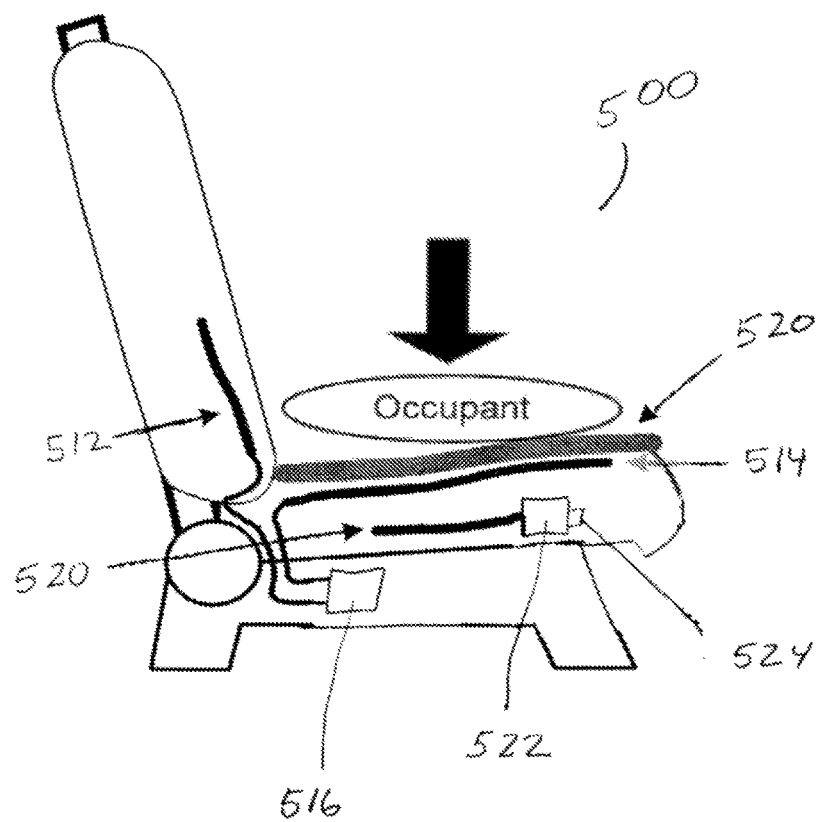
FIG. 5 is a schematic drawing of a vehicle seat including a seat heater and an occupant detection system.

FIG. 5 discloses a occupant sensing and classification system 500. The system 500 incorporates elements of the system described above. The system 500 may include a seat heater. The seat heater may include a seat back heating element 512 and/or a seat bottom heating element 514. The seat bottom heating element 514 is located beneath a seat cover or seat pad 520. The heating elements may be controlled by a seat heater controller 516. Alternatively, the same controller could be used for control of both occupant detection and sensing and the seat heater.

The system 500 includes a sensing mat 530 that a sensing electrode and a shield electrode separated by a compressible material. The sensing mat 520 or is placed in the seat bottom, ideally underneath the seat foam. The sensor would measure weight or force on the seat by calculating the impedance between the sensing electrode and shield electrode using the electronics 310 described above with regard to the weight sensing mode. According to this embodiment of the system 500, the occupant sensing configuration (i.e., capacitance based measurement of the sensing electrode) would not be required. Occupant detection would be conducted primarily based on the force or weight sensing measurements and calculations. For example, the occupant of the seat would be determined when the measure of force exceeds a threshold value corresponding to a particular sized occupant. In one embodiment, the actual weight of the occupant need not be determined as the measures of impedance between the sensing and shield electrodes could be used to correlate to a particular sized occupant.

The system 500 includes a controller 522 for controlling the signal (e.g., voltage or current) provided to the sensor mat 520 and the sensing and shield electrodes. The controller 522 is configured to perform the occupant classification and/or detection determinations and provide a corresponding signal to other vehicle systems and subsystems via a bus or other electrical connection. The controller 522 may connected to the vehicle communication bus via a connection 524.

According to an alternative embodiment, measurements obtained using the occupant sensing configuration and corresponding signal processing could be used in order to determine a wet seat condition. Seat wetness could affect the measurement obtained in the weight sensing configuration. Determination of a wet seat condition could be used to make a corresponding adjustment to the calculations performed on the measurements obtained using the seat wetness may be necessary information as seat wetness would affect the sensor to shield measurement. Use of electric field or capacitive type sensing to detect a wet seat condition is disclosed for example in U.S. Patent Publication 2007/0192007 (incorporated by reference herein).

The above described force or weight based occupant detection system 500 may operate in conjunction with a seat belt tension sensor. For example, as described in U.S. Pat. No. 6,260,879 (incorporated by reference herein), the force exerted downwardly onto the vehicle seat may result from two different components. One component is attributable to the mass of the occupant, and another component may be the force attributable to the tension present in the vehicle seat belt. A seat belt tension measurement sensor may be provided to determine the amount of force acting downwardly on the vehicle seat as a result of seat belt tension. The tension in the seat belt as measured by the seat belt tension sensor provides an indication of the presence of a tightly belted child seat or other object.

Although specific shapes of each element have been set forth in the drawings, each element may be of any other shape that facilitates the function to be performed by that element. For example, the electrodes have been shown to be planar electrodes, however, in other exemplary embodiments the structure may define electrodes of other shapes. Further, while a specific form of switches has been shown in FIG. 3, according to other exemplary embodiments, the switches may be in other forms or actuate in different directions. The sensing and classification system described in detail above, may be employed with existing occupant detection systems such as those described in U.S. Pat. No. 8,138,772, which is incorporated by reference herein in its entirety.

During the life of operation of the occupant detection system described herein it is possible for the output of the sensor to change over time. This output may result in an increase or decrease in sensor output. Thus, the system may include an adjustment in order to account for any increase or decrease in the output of the sensor. The sensor output can be considered to be the current or impedance of the sensor as measured by the sensing or measurement circuit. For example, the measured values of imaginary and quadrature components of the current and/or impedance may increase or decrease over time. Thus, there is the potential for an incorrect classification when the detected measures are compared to a threshold. The adjustment can be configured as an offset to the measured value prior to comparing the value to the threshold. In the alternative, the threshold may be adjusted or offset to account for the change in sensor output.

The system includes a durability cycle counter (DCC), which is a non-volatile counter representing seat occupation. For example, when the measure of the quadrature current exceeds the threshold indicating that an occupant is in the seat the DCC would increment. The system employs a non-volatile variable (Y) that represents the number of seat durability cycles encountered during the life of the system resulting in an offset value (X). The lifetime offset value (X) could be considered a maximum offset value. The value of the offset value (X) may be obtained during seat durability testing.

The counter DCC is increased (i.e., incremented upward) when the system determines that the seat is occupied. For the purposes of incrementing the DCC, the seat is considered to be occupied in the following two conditions: (1) the seat is determined to be occupied by a person (e.g., determined by comparing the quadrature measure to the threshold); and (2) the seat is occupied by a belted child seat (e.g., a tightly cinched child restraint seat CRS). In particular, the system is configured to increment the counter in the following situations. First, when the vehicle key is switched from OFF to ON if the seat is occupied, the counter is increased. Second, while the vehicle key is in the ON condition if the seat changes from unoccupied to occupied, the counter is increased.

The above described system is configured to discriminate between the occupied and unoccupied seating conditions. In general, the unoccupied seat may be characterized by a measure of the quadrature component of the sensing current or impedance being less than the threshold in combination while, at the same time, the force on the seat provides a relatively lower force value. When a seat is occupied by an adult, the quadrature component of the sensing current or impedance will typically exceed the threshold value and a relatively higher force value representing the force on the seat will be present. When a child restraint seat is cinched down on the seat, the measure of the quadrature component of the sensing current or impedance will typically be less than the threshold value while the force on the seat will be relatively higher.

According to an embodiment, the system may be configured to include a maximum value of the counter (DCC). For example, the change in sensor output (e.g., increase or decrease) has been determined to become relatively stable after a certain number of cycles. This maximum number of cycles, which may be approximated, is set as an established value ($C_{MAX}$). After the DCC reaches the maximum value ($C_{MAX}$) a constant offset value (X) is applied to the sensor measurement ($Y_{SX\_MEASURED}$) and a final adjusted value of the measure ($Y_{SX}$) is determined. The constant offset value (X) may depend on the type of seat and seat material (e.g., leather, cloth or other). This final adjusted value of the measure ($Y_{SX}$) is compared to the threshold to determine the occupancy state of the seat.

Prior to the counter (DCC) reaching the established maximum value ($C_{MAX}$), the sensor measurement ($Y_{SX\_MEASURED}$) may be adjusted by a varying amount depending on the value of the counter (DCC). For example, the constant offset value (X) may be reduced an amount based upon how many times the counter (DCC) has incremented. Thus, for example, the sensor measurement ($Y_{SX\_MEASURED}$) is adjusted by an increasing amount over the life of the system, until the DCC reaches the established maximum counter value ($C_{MAX}$). After the DCC reaches the maximum value ($C_{MAX}$) the sensor measurement adjustment is constant.

The system configuration described above, may be represented by the following equations:

When DCC< or =$C_{MAX}$, then $$Y_{SX} = Y_{SX\_MEASURED} - X*(DCC/C_{MAX})$$

When DCC>$C_{max}$, then $$Y_{SX} = Y_{SX\_MEASURED} - X$$

Where $Y_{SX\_MEASURED}$ is the unadjusted value of the measurement and $Y_{SX}$ is the final value compared to the threshold. For example, as described above, the measurement may correspond to a quadrature component of the current applied to the sensing electrode. The above configuration may be implemented in a system controller. For example, the controller may include a processor that is configured to adjust the measurement and apply the appropriate offset value. In the equations above, the adjustment is shown as a subtraction from the measured value. However, the adjustment may be made by subtracting or adding the adjustment value to the measured value depending on how the sensor output changes over time.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature The present disclosure has been described with reference to example embodiments, however persons skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

What is claimed is:

1. A system for classifying an occupant of a vehicle seat comprising:
    a sensing electrode located in in the seat;
    a sensing circuit configured to provide a current to the sensing electrode;
    wherein the sensing circuit is configured to measure a quadrature component of the current provided to the sensing electrode;
    a controller that is configured to detect and classify the occupant by comparing a measure of the quadrature component of the current provided to the sensing electrode to a threshold; and
    wherein the measure of the quadrature component of the current provided to the sensing electrode is adjusted by an offset value that varies based on a value of a non-volatile counter, and wherein the value of the non-volatile counter is based on the number of times that an occupant is detected to be sitting in the vehicle seat.

2. The system of claim 1, wherein the value of the counter is based on the number of times during the life of operation of the system that an occupant is detected to be sitting in the vehicle seat.

3. The system of claim 1, wherein the value of the counter is incremented upward if the controller determines that the seat is occupied and the vehicle key is turned to the ON position.

4. The system of claim 1, wherein the counter is incremented upward if the controller determines that a belted child seat is located in the seat and the vehicle key is turned to the ON position.

5. The system of claim 1, wherein the counter is incremented upward if the controller determines that seat classification changes from unoccupied to occupied while the vehicle key is in the ON position.

6. The system of claim 1, wherein the counter is incremented upward if the controller determines that the seat classification changes from unoccupied to a belted child seat while the vehicle key is in the ON position.

7. A system for detecting an occupant in a vehicle seat, comprising:
    a sensing electrode located in a seat bottom of a vehicle seat;
    a shield electrode located in the vehicle seat below the sensing electrode;
    a sensing circuit operatively coupled to the sensing electrode and the shield electrode;
    a controller operatively coupled to the sensing circuit, wherein the controller operates to configure the sensing circuit to apply a shield current to the shield electrode and a sensing current to the sensing electrode; and
    wherein the controller is configured to detect the presence of an object in the seat by detecting a measure of the force applied to the seat by the object based on the impedance between the sensing electrode and the shield electrode;
    wherein the controller is configured to detect the presence of an object in the seat by comparing a measure of the quadrature component of the sensing current to a threshold wherein the measure of the quadrature component of the sensing current is adjusted by an offset value that varies based on a value of a non-volatile counter, and wherein the value of the non-volatile counter is based on the number of times that an occupant is detected to be sitting in the vehicle seat.

8. The system of claim 7, wherein the offset value is based on a ratio of the value of the non-volatile counter and a maximum offset value that is based on an expected operating life of the system.

9. The system of claim 8, wherein the maximum offset value is determined during seat durability testing.

10. The system of claim 7, wherein the value of the counter increases in increments and is based on the number of times during the life of operation of the system that an occupant is detected to be sitting in the vehicle seat.

11. The system of claim 10, wherein the value of the counter increments upward if the seat is occupied and the vehicle key is turned to the ON position.

12. The system of claim 10, wherein the value of the counter increments upward if the controller determines that a belted child seat is located in the vehicle seat and the vehicle key is turned to the ON position.

13. The system of claim 10, wherein the value of the counter increments upward if the controller determines that seat classification changes from unoccupied to occupied while the vehicle key in in the ON position.

14. The system of claim 10, wherein the value of the counter increments upward if the controller determines that the seat classification changes from unoccupied to a belted child seat while the vehicle key is in the ON position.

15. A method of detecting an occupant in a vehicle seat comprising the steps of:
    providing a sensing electrode located in in the seat;
    providing a current to the sensing electrode;
    measuring a quadrature components of the current provided to the sensing electrode;
    detecting and classifying the occupant in the seat by comparing a measure of the quadrature component of the current provided to the sensing electrode to a threshold; and
    wherein the measure of the quadrature component of the current provided to the sensing electrode is adjusted by an offset value that varies based on a value of a non-volatile counter, and wherein the value of the non-volatile counter is based on the number of times that an occupant is detected to be sitting in the vehicle seat.

16. The method of claim 15, further comprising the step of increasing the value of the counter based on the number of times that an occupant is detected to be sitting in the vehicle seat, wherein the value of the non-volatile counter is based on the number of times during the life of operation of the vehicle seat that an occupant is detected to be sitting in the vehicle seat.

17. The method of claim 15, further comprising the step of increasing the value of the counter when the controller determines that the seat is occupied and the vehicle key is turned to the ON position.

18. The method of claim 15, further comprising the step of increasing the value of the counter when the controller determines that a belted child seat is located in the vehicle seat and the vehicle key is turned to the ON position.

19. The method of claim 15, further comprising the step of increasing the value of the counter when the controller determines that seat classification changes from unoccupied to occupied while the vehicle key in in the ON position.

20. The method of claim 15, further comprising the step of increasing the value of the counter when the controller determines that the seat classification changes from unoccupied to a belted child seat while the vehicle key is in the ON position.

* * * * *